United States Patent

[11] 3,596,698

| [72] | Inventor | George M. Jordan<br>Akron, Ohio |
|---|---|---|
| [21] | Appl. No. | 841,377 |
| [22] | Filed | July 14, 1969 |
| [45] | Patented | Aug. 3, 1971 |
| [73] | Assignee | Akro-Mills, Inc.<br>Akron, Ohio |

[54] TIRE INSTALLATION DEVICE
12 Claims, 2 Drawing Figs.

[52] U.S. Cl. .................................. 157/1.1
[51] Int. Cl. ................................... B60c 25/12
[50] Field of Search ......................... 157/1.1, 1.11, 1.17, 1.2

[56] References Cited
UNITED STATES PATENTS

| 2,874,759 | 2/1959 | Ranallo | 157/1.1 |
| 3,081,816 | 3/1963 | Branick | 157/1.1 |
| 3,280,880 | 10/1966 | Ericson et al. | 157/1.1 |

Primary Examiner—Granville Y. Custer, Jr.
Attorney—Hamilton, Cook, Renner & Kenner ABSTRACT: An uninflated torus-shaped tube of soft elastomeric material having high stretch properties for facilitating inflating and seating a tubeless automobile tire on its rim, said tube adapted to be interposed between and to form a seal with the inner surface of the adjacent rim flange and the tire sidewall before inflation thereof, whereby as air under pressure is introduced into the tire between its beads the bead adjacent said tube progressively compresses said tube while maintaining its seal with said sidewall and rim as the bead moves into sealing contact with its bead seat and finally ejects said tube.

Patented Aug. 3, 1971

INVENTOR
GEORGE M. JORDAN
BY Hamilton, Cook,
Renner & Kenner
ATTORNEYS 3,596,698

1

TIRE INSTALLATION DEVICE

BACKGROUND OF THE INVENTION

Tubeless pneumatic tires require auxiliary devices for maintaining seals between the tire beads and the rim flanges as the tire is being inflated on its rim, as otherwise the air under pressure being introduced will blow by one of the beads before it is seated. Usually the tire and rim are in a horizontal position, and the air tends to blow by the upper bead.

Certain prior devices for installing tubeless tires on their rims by inflating the tire in horizontal position to cause the tire beads to seal against the bead seats of the rim have embodied means applied to the tread of the tire to constrict it radially during inflation and thereby hold the tire beads in sealing contact with the rim. Such devices do not work satisfactorily for recent forms of tires, such as radial and belted tires, because they have bands or belts of substantially incompressible material such as wire or fiberglass under the treads which prevent any material amount of radial compression of the tires.

Various devices have been proposed for installing and inflating these radial and belted tires, some having a dome enclosing an air chamber which is pressed downwardly for sealing against the tire sidewall to enclose the tire bead and rim during inflation, and others having an annular band applied downwardly and having annular sealing surfaces to contact the tire sidewall and the outer periphery of the rim, thus preventing the escape of air under pressure being introduced within the tire. These devices usually require apparatus for holding the annular sealing device axially against the tire or against the tire and rim, and where separate sealing surfaces are required for the sidewall and rim it is difficult to maintain the seal at both places as air under pressure is introduced to inflate the tire.

It has been proposed also to provide a sealing ring of substantially teardrop shape in cross section having a solid tapered portion for fitting between the tire sidewall and rim flange, but as with other prior rings or bands, this ring has to be made in different circumference sizes to fit different size rims. Moreover, if the material of the ring has sufficient resiliency to maintain a good seal, the solid teardrop cross-sectional portion makes it difficult to install the ring by stretching it over the rim flange.

SUMMARY OF THE INVENTION

The primary object of the invention is to provide a hollow vented elastomeric ring of low durometer hardness having sufficient stretchability to fit over the rim flanges of various diameter wheel rims and sufficient resiliency to maintain a seal between the rim flange and the sidewall of a tubeless tire thereon as the tire is inflated.

Another object is to provide a novel sealing ring which is easily installed manually without tools, is held in position without external pressure, and which automatically ejects itself as the tire is inflated.

Another object is to provide a sealing ring having a hollow circular cross section which is easy and inexpensive to mold.

These and other objects are accomplished by the improvements comprising the present invention, a preferred embodiment of which is shown and described herein by way of example, the scope of the invention being defined in the appended claims.

DESCRIPTION OF A PREFERRED EMBODIMENT

Figure 1:
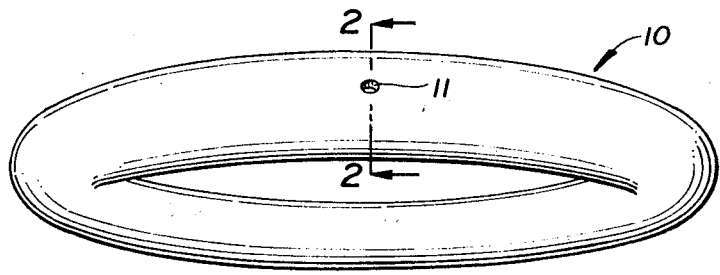
FIG. 1 is a perspective view of a hollow elastomeric ring embodying the invention.
Figure 2:
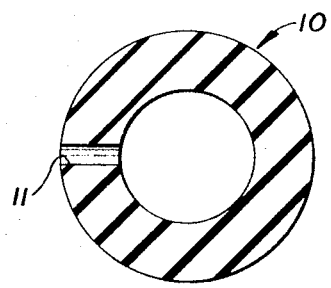
FIG. 2 is an enlarged cross-sectional view on line 2—2 of FIG. 1.

The novel and improved hollow ring or torus indicated generally at 10 is made of synthetic rubber such as neoprene, or other elastomeric material. The durometer specification of the material is carefully controlled to be substantially Shore "A" 25 plus or minus 5 so as to have the proper softness, and to have a low modulus of elasticity giving it a high stretchability of 8.6-inch deflection, plus or minus 15 percent under 100 pounds static load.

The inner diameter of the ring is 12 ½ inches and the outer diameter is 16 ½ inches, making the cross-sectional outer diameter of the tubular ring 2 inches with a wall thickness of three-eighths inch. The cross-sectional outer diameter of the tube should be held within plus or minus 0.015 inch, and the wall thickness should be held within plus or minus 0.031 inch.

By maintaining the dimensions of the tubular ring 10 and the durometer specification and stretchability within the limits above specified, the ring can be used interchangeably to mount radial-belted or bias-belted tires on standard rims of 13 inch, 14 inch, and 15-inch diameter.

As shown in the drawings, the ring 10 is molded to have a hole 11 of about one-sixteenth inch in diameter in its outer wall so that the ring contains air at atmospheric pressure which is gradually expelled as the ring is compressed.

Figure 3:
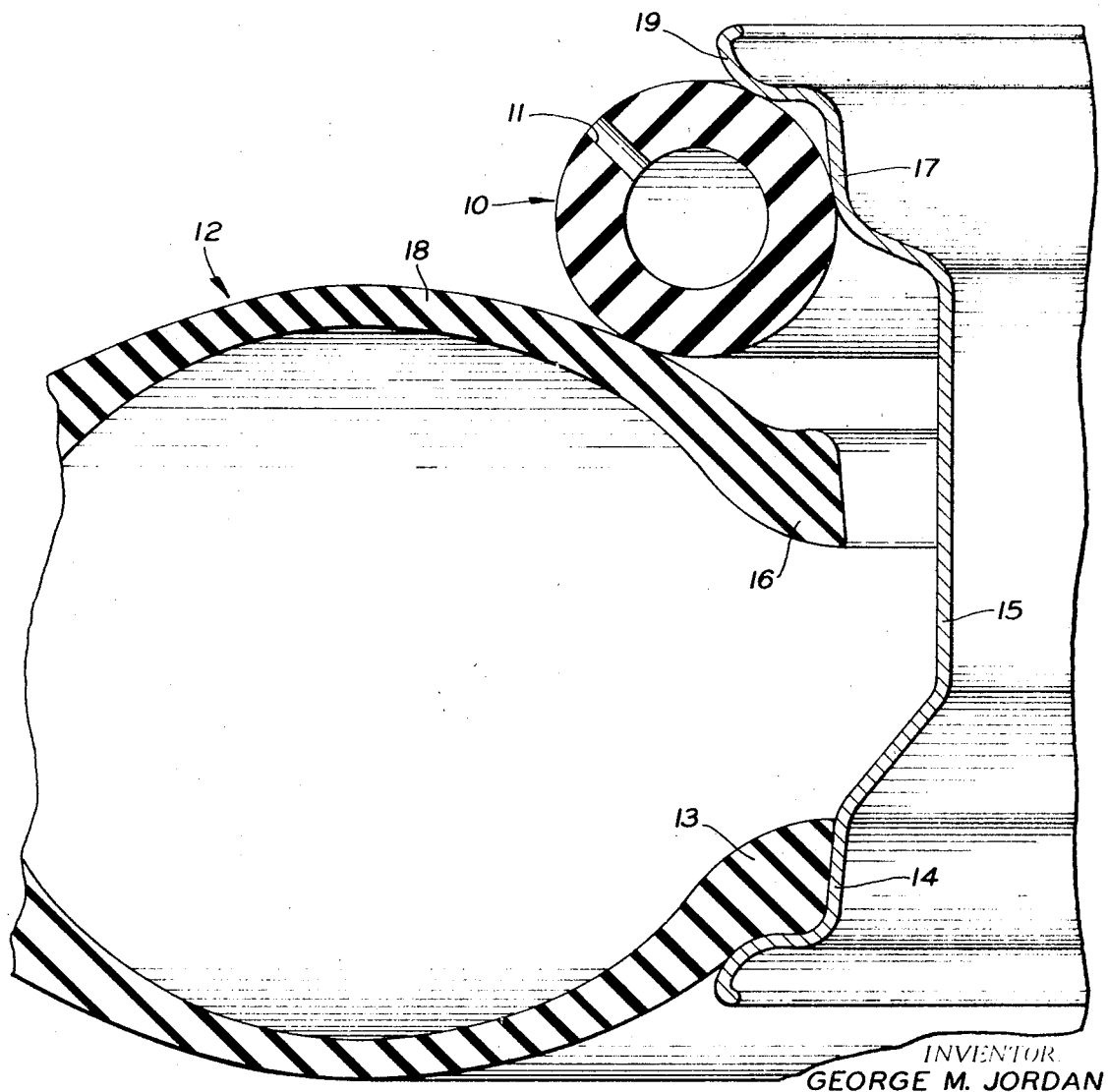
FIG. 3 is a cross-sectional view showing a tire casing with its lower bead seated on the bead seat of a rim, and the improved ring interposed between the upper rim flange and the upper sidewall of the casing, prior to inflating the casing.

Referring to FIG. 3, a tubeless tire casing of the conventional radial or bias-belted type is represented as a whole at 12, and is shown in a horizontal position with its lower bead 13 abutting the lower annular bead seat 14 of a conventional drop center rim 15, the rim being supported in horizontal position on any conventional tire mounting table or pedestal (not shown). When the tire casing is positioned around the rim, the weight of the casing normally holds the lower bead 13 in position against the lower bead seat 14, and the upper bead 16 drops below the upper bead seat 17. Thus, if air is introduced through the usual valve in the rim to inflate the tire, the air merely blows out between the upper bead 16 and the rim without inflating the tire.

In order to inflate the tire using the ring 10, the ring is positioned between the upper sidewall 18 and the upper rim flange 19 of the rim, as shown in FIG. 3, to make an airtight seal annularly at those two points across its transverse diameter and enclose the upper bead in an annular chamber communicating with the interior of the casing. In order to facilitate inserting and ejecting the ring 10, the upper sidewall and upper rim surfaces, as well as the surface of the ring, are coated with tire lubricant, such as a conventional glycerin base lubricant. A little practice will determine the right amount of lubricant needed to prevent the tube from becoming pinched and failing to eject because of too little lubricant, or ejecting prematurely because of too much lubricant. The ring may be manually stretched progressively over the upper rim flange into the position shown in FIG. 3, with the hole 11 directed outwardly.

Figure 4:
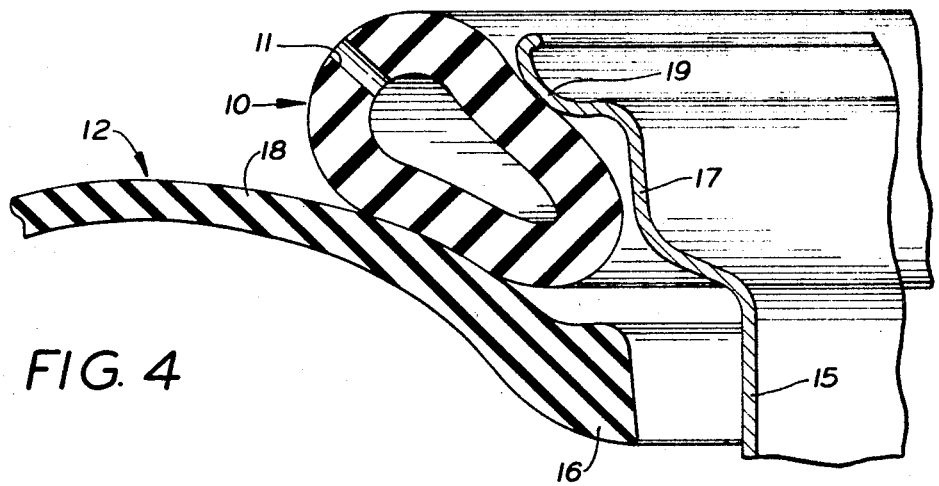
FIG. 4 is a fragmentary sectional view similar to FIG. 3, showing the improved tube partly compressed after inflation has started.
Figure 5:
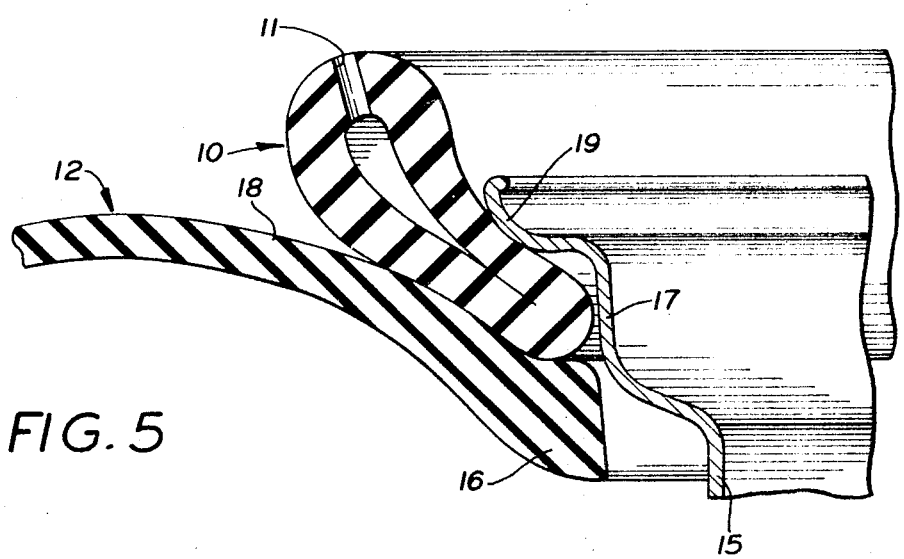
FIG. 5 is a similar view showing the tube further compressed as inflation pressure increases.
Figure 6:
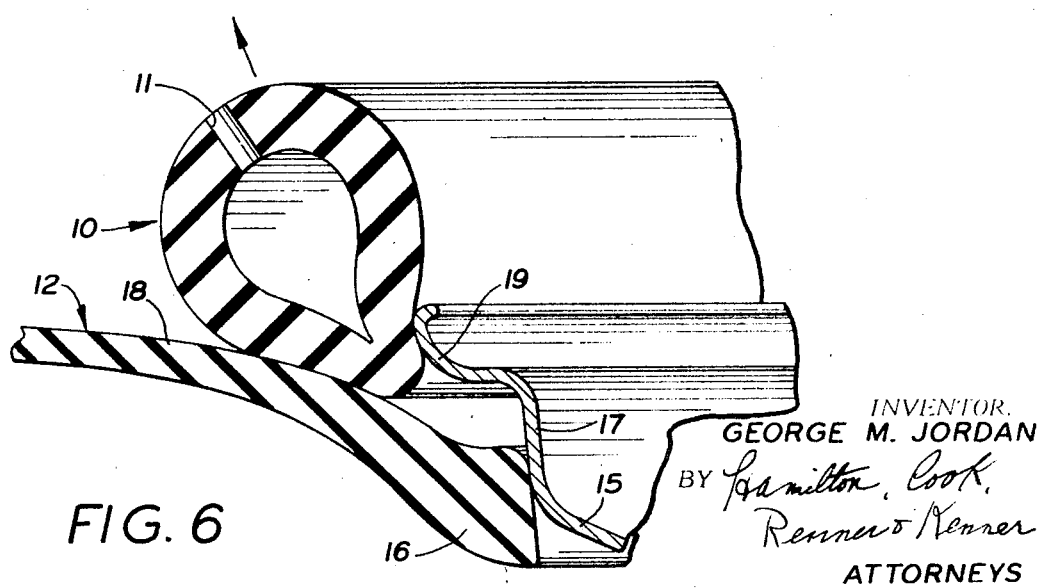
FIG. 6 is a similar view showing the upper bead beginning to seat on the bead seat of the rim and the tube being ejected as the pressure forces the bead toward the rim flange.

As shown in FIGS. 4, 5 and 6, as the inflation air under pressure is introduced the upper bead moves upwardly gradually compressing the ring and expelling the atmospheric air therefrom. As the bead 16 approaches the bead seat 17, the inner part of the ring 10 is substantially fully compressed, as shown in FIG. 5. Then as the bead 16 begins to seat on its bead seat 17 and forms an airtight seal, the inner portion of the ring is progressively squeezed and expelled from between the sidewall and rim, to automatically remove itself, as shown in FIG. 6.

The novel ring is relatively inexpensive to mold because of its circular cross section, is easily installed manually without tools between the tire sidewall and rim flange of various sizes of rims due to its softness and flexibility, maintains a seal therebetween as the tire is inflated, and automatically ejects itself when the beads of the tire are both seated on the bead seats of the rim.

I claim:

1. A vented torus-shaped tube of substantially circular cross section for insertion between the rim flange of a wheel rim and the sidewall of an uninflated tubeless tire loosely mounted on said rim, said tube being of relatively soft elastomeric material having high stretch properties adapted for fitting around rims of various diameters, said tube having a cross-sectional diameter adapted for maintaining an airtight seal across its transverse diameter between said sidewall and rim at the beginning of and during inflation of the tire until the inflation pressure is sufficient to eject the tube and allow the bead of said sidewall to seat on the bead seat of said rim.

2. A tube as defined in claim 1, in which the outer diameter of the tube is substantially 16 ½ inches and the cross-sectional diameter of the tube is substantially 2 inches, with a wall thickness of substantially 0.375 inch.

3. A tube as defined in claim 1 in which the outer diameter of the tube is substantially 16½ inches and the cross-sectional diameter of the tube is 2 inches plus or minus 0.015 inch, with a wall thickness of 0.375 inch plus or minus 0.031 inch.

4. A tube as defined in claim 1, having a durometer hardness of Shore "A" plus or minus 5.

5. A tube as defined in claim 4, having a stretch deflection of 8.6 inches plus or minus 15 percent under a static load of 100 pounds.

6. A tube as defined in claim 2 having a durometer hardness of Shore "A" plus or minus 5.

7. A tube as defined in claim 2 having a stretch deflection of 8.6 inches plus or minus 15 percent under a static load of 100 pounds.

8. A tube as defined in claim 3 having a durometer hardness of Shore "A" plus or minus 5.

9. A tube as defined in claim 3 having a stretch deflection of 8.6 inches plus or minus 15 percent under a static load of 100 pounds.

10. In combination with a tubeless automobile tire and a wheel rim therefor having outer rim flanges, a vented torus-shaped tube of substantially circular cross section adapted for maintaining an airtight seal across its transverse diameter between one of said rim flanges and a sidewall of said tire when uninflated and loosely mounted on said rim, said tube being of relatively soft elastomeric material having high stretch properties adapted for manual positioning over the rim flange and self ejection therefrom as the tire is inflated.

11. A torus-shaped tube of substantially circular cross section for insertion between the rim flange of a wheel rim and the sidewall of an uninflated tubeless tire loosely mounted on said rim, said tube being of relatively soft elastomeric material having high stretch properties adapted for fitting around rims of various diameters, said tube having a cross-sectional diameter adapted for maintaining an airtight seal across its transverse diameter between said sidewall and rim at the beginning of and during inflation of the tire until the inflation pressure is sufficient to eject the tube and allow the bead of said sidewall to seat on the bead seat of said rim.

12. A tube as defined in claim 11, in which the outer diameter of the tube is substantially 16½ inches and the cross-sectional diameter of the tube is substantially 2 inches, with a wall thickness of substantially 0.375 inch.